（12）United States Patent
Li et al.

(10) Patent No.: US 12,187,172 B2
(45) Date of Patent: Jan. 7, 2025

(54) ANGLE ADJUSTMENT STRUCTURE AND CHILD CARRIER

(71) Applicant: BAMBINO PREZIOSO SWITZERLAND AG, Steinhausen (CH)

(72) Inventors: Ruyi Li, Guangdong (CN); Xiangyong Zeng, Guangdong (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/790,063

(22) PCT Filed: Dec. 30, 2020

(86) PCT No.: PCT/IB2020/062531
§ 371 (c)(1),
(2) Date: Jun. 29, 2022

(87) PCT Pub. No.: WO2021/137164
PCT Pub. Date: Jul. 8, 2021

(65) Prior Publication Data
US 2023/0040817 A1    Feb. 9, 2023

(30) Foreign Application Priority Data

Dec. 30, 2019 (CN) .......................... 201911424778.4

(51) Int. Cl.
*B60N 2/28* (2006.01)
(52) U.S. Cl.
CPC ......... *B60N 2/2869* (2013.01); *B60N 2/2875* (2013.01); *B60N 2/2824* (2013.01); *B60N 2/2887* (2013.01)
(58) Field of Classification Search
CPC .................................................. B60N 2/2869
See application file for complete search history.

(56) References Cited

U.S. PATENT DOCUMENTS 6,199,949 B1 *   3/2001  DaSilva ............... B60N 2/2857
                                                    297/256.16
8,186,757 B2    5/2012  Duncan
(Continued)

FOREIGN PATENT DOCUMENTS

CN         101284501 A      10/2008
CN         201847236 U       6/2011
(Continued)

OTHER PUBLICATIONS

Office Action issued in counterpart Chinese Patent Application No. 201911424778.4, dated Oct. 9, 2022.
(Continued)

*Primary Examiner* — David R Dunn
*Assistant Examiner* — Tania Abraham
(74) *Attorney, Agent, or Firm* — Volpe Koenig

(57) ABSTRACT

The present disclosure provides an angle adjustment structure for adjusting an angle of a body relative to a base. The angle adjustment structure includes a positioning member and a locking member for locking with the positioning member, the body is rotatably connected to the base, and the body is provided with at least two of the positioning members, and the locking member is movably disposed on the base, and the locking member and the positioning member are locked or unlocked by means of movement of the locking member. In addition, the present disclosure further provides an child carrier having the angle adjustment structure. The child carrier of the present disclosure can bring a variety of different visual experiences for the child on the body, and also at the same time help the caregiver for taking care of the child, and has a simple structure and is easy to operate.

19 Claims, 10 Drawing Sheets

(56) References Cited

U.S. PATENT DOCUMENTS

| | | | |
|---|---|---|---|
| 10,829,012 B1 * | 11/2020 | Brunick | B60N 2/2875 |
| 2010/0225150 A1 | 9/2010 | Duncan et al. | |
| 2017/0355287 A1 | 12/2017 | Anderson et al. | |
| 2019/0077282 A1 * | 3/2019 | Reaves | B60N 2/2806 |

FOREIGN PATENT DOCUMENTS

| | | | | |
|---|---|---|---|---|
| CN | 203472600 U | 3/2014 | | |
| CN | 204020629 U | 12/2014 | | |
| CN | 104290621 A | 1/2015 | | |
| CN | 104627037 A | 5/2015 | | |
| CN | 105015371 A | 11/2015 | | |
| CN | 206151038 U | 5/2017 | | |
| CN | 107813737 A | 3/2018 | | |
| CN | 108621880 A | 10/2018 | | |
| CN | 109849747 A | 6/2019 | | |
| CN | 209111986 U | 7/2019 | | |
| CN | 110497826 A | 11/2019 | | |
| CN | 111278677 A | 6/2020 | | |
| DE | 102009028436 A1 | 2/2010 | | |
| DE | 202014103298 U1 * | 10/2014 | | B60N 2/2824 |
| DE | 202015104788 U1 | 11/2015 | | |
| DE | 20202015104788 U1 | 11/2015 | | |
| DE | 202016104181 U1 | 8/2016 | | |
| DE | 102017203726 A1 | 9/2017 | | |
| DE | 202017105584 U1 | 12/2018 | | |
| EP | 3144178 A1 | 3/2017 | | |
| EP | 3190001 A1 * | 7/2017 | | |
| FR | 2854597 A1 * | 11/2004 | | B60N 2/2821 |
| KR | 101427095 B1 | 8/2014 | | |
| TW | 200930590 A | 7/2009 | | |

OTHER PUBLICATIONS

Office Action for corresponding EP Application No. 20 839 396.7-1012 dated Jul. 10, 2023.

Office Action for corresponding CN Application No. 201911424778.4 dated Jun. 27, 2023.

Taiwanese Office Action for Application No. 109146647 dated Jan. 12, 2023.

International Search Report mailed in corresponding International Patent Application No. PCT/IB2020/062531 on Mar. 11, 2021, consisting of 4 pp.

Written Opinion mailed in corresponding International Patent Application No. PCT/IB2020/062531 on Mar. 11, 2021, consisting of 5 pp.

Office Action mailed in corresponding Taiwanese Patent Application No. 109146647 on Oct. 13, 2021, consisting of 7 pp.

Office Action issued in corresponding Taiwanese Application No. 112132484 dated Apr. 18, 2024.

Notice of Allowance for corresponding CN Application No. 201911424778.4 dated Aug. 22, 2024.

Taiwanese Office Action for Application No. 112132484 dated Sep. 6, 2024.

* cited by examiner

ANGLE ADJUSTMENT STRUCTURE AND CHILD CARRIER

CROSS-REFERENCE TO RELATED APPLICATIONS

This application is a 371 National Phase of International Application No. PCT/IB2020/062531, filed on Dec. 30, 2020, which claims priority to Chinese Patent Application No. 201911424778.4, filed on Dec. 30, 2019, which is incorporated herein by reference in its entirety.

TECHNICAL FIELD

This disclosure relates to the technical field of baby products, in particular to an angle adjustment structure and a child carrier with the angle adjustment structure.

BACKGROUND

With increasing safety awareness of people, more and more parents choose a vehicle safety seat to protect child's safety while sitting in a car. When a child sits in the car, it is general to install the vehicle safety seat on the car seat to provide safety protection for the child sitting in the car.

SUMMARY

The present disclosure provides an angle adjustment structure for adjusting an angle of a body relative to a base, comprising a positioning member and a locking member for locking with the positioning member, the body is rotatably connected to the base, and the body is provided with at least two of the positioning members, and the locking member is movably disposed on the base, and the locking member and the positioning member are locked or unlocked by means of movement of the locking member.

The present disclosure provides a child carrier, which includes a body for carrying a child and a base rotatably connected with the body, and also includes the angle adjustment structure as above mentioned.

Figure 1:
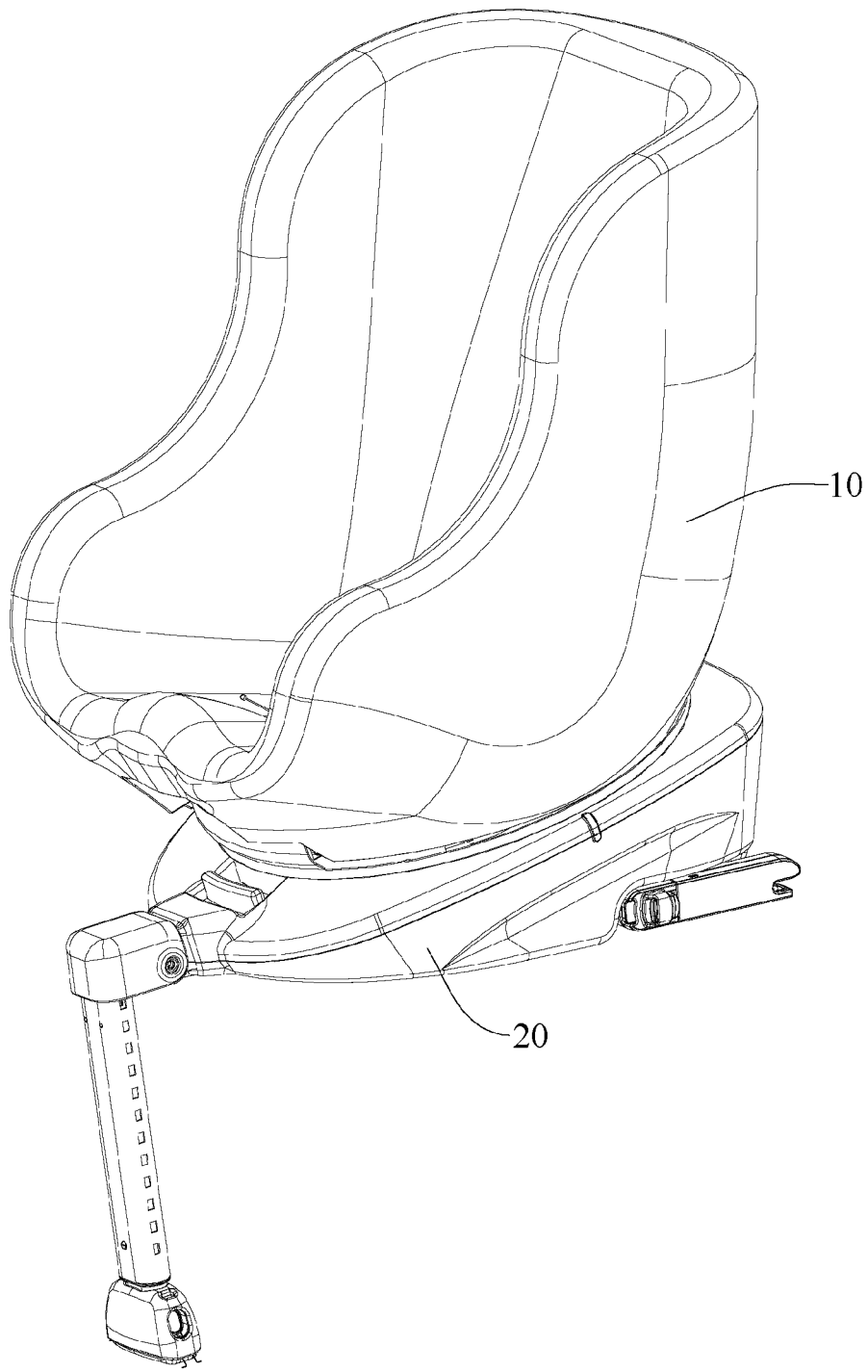
FIG. 1 is a schematic structural view of a child carrier provided by an embodiment of the present disclosure.

Reference numbers are listed as follows:
100 child carrier;
10 body; 11 positioning member; 12 concave portion; 111 fixing portion; 112 positioning portion; 113 engaging gap;
20. base; 21 locking member; 211 hook portion; 212. rotating portion; 213 connecting portion; 214 resilient member; 22 fixing member; 221 limiting portion; 23 driving member; 24 operating member; 25 accommodating cavity; 26 convex portion

DETAILED DESCRIPTION

Further description will be given below in conjunction with embodiments and accompanying figures in order to describe the technical content and the structural features of the present disclosure in detail.

Referring to FIGS. 1 to 5, the present disclosure provides a child carrier 100, which includes a body 10 for carrying a child and a base 20 rotatably connected with the body 10, and also includes an angle adjustment structure for adjusting an angle of the body 10 relative to the base 20. The angle adjustment structure includes a positioning member 11 and a locking member 21 that may locks the positioning member 11. Since the body 10 is rotatably connected to the base 20, at least two positioning members 11 are disposed on the body 10, and the locking member 21 is movably arranged on the base 20, and the locking member 21 and the positioning member 11 are locked or unlocked by means of the movement of the locking member 21. It should be understood that the locking member 21 may be movable to lock on the positioning member 11 such that the body 10 is secured to the base 20, or the locking member 21 may be movable to unlock the positioning member 11 such that the body 10 may be rotatable relative to the base 20. On the other hand, by arranging two positioning members 11 on the body 10, the body 10 after rotating relative to the base 20 is locked on different position of the base 20, i.e., at least on two different positions on the base 20, that is, the body 10 may be fixed on the base 20 at different angles.

Specifically, an included angle is formed between two adjacent ones of the positioning members 11 to the rotation center of the body 10 and the base 20, illustratively, a center of a concave portion 12 on the body 10 is used as a rotation center, that is, the two adjacent ones of the positioning members 11 takes the center of the concave portion 12 as a common end point, and the two positioning members 11 and the center of the concave portion 12 form an included angle with a certain angle. The angle of the included angle can be any angle other than 0°. That is, the positioning member 11 is located in the circle with a rotation center as a circle center, and the two positioning members 11 may not be located on the same radius of the circle.

After application of the above technical solutions, the child carrier 100 of the present disclosure is provided with an angle adjustment structure. The angle adjustment structure is provided with a positioning member 11 and a locking member 21 between the body 10 and the base 20. The locking member 21 is movably disposed on the base 20, and at least two positioning members 11 are disposed on the body 10. When the body 10 and base 20 need an angle adjustment, the locking member 21 is driven to be movable to allow the locking member 21 to unlock the positioning member 11, so that the body 10 can rotate relative to the base 20 for the angle adjustment. After the body 10 rotates by a certain angle relative to the base 20, the positioning member 11 is locked by the locking member 21, so that the body 10 is fixed on the base 20, thereby completing the angle adjustment of the body 10 rotating relative to the base 20. The body 10 can be rotated to different angles relative to the base 20, which can bring a variety of different visual experiences for the child, and at the same time help the caregiver for taking care of the child. The caregiver can rotate the body 10 to a suitable position for convenience of taking care of the child. The child carrier 100 of the present disclosure has strong practicability and is suitable for widespread use.

Figure 4:
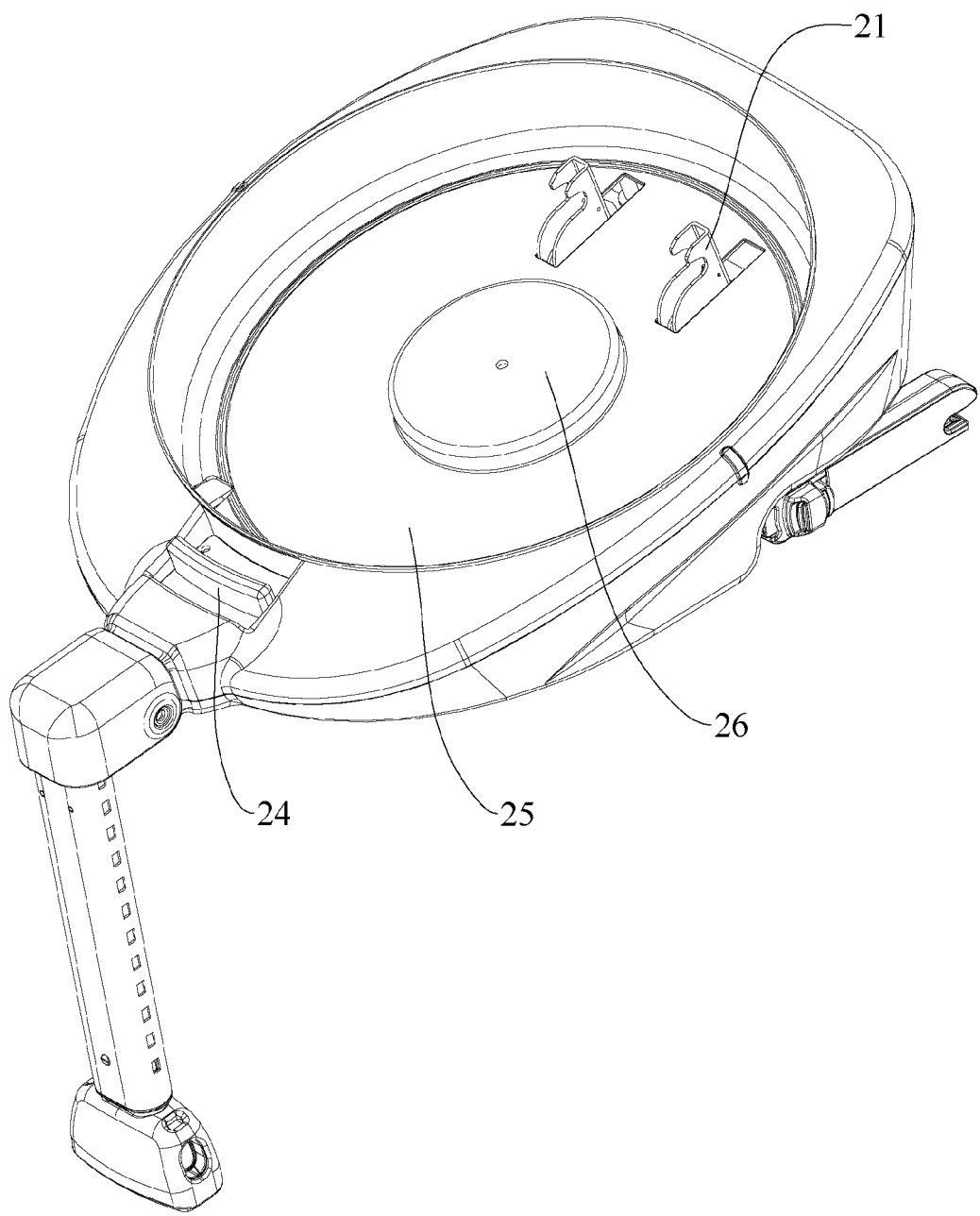
FIG. 4 is a schematic structural view of a base in FIG. 1.
Figure 5:
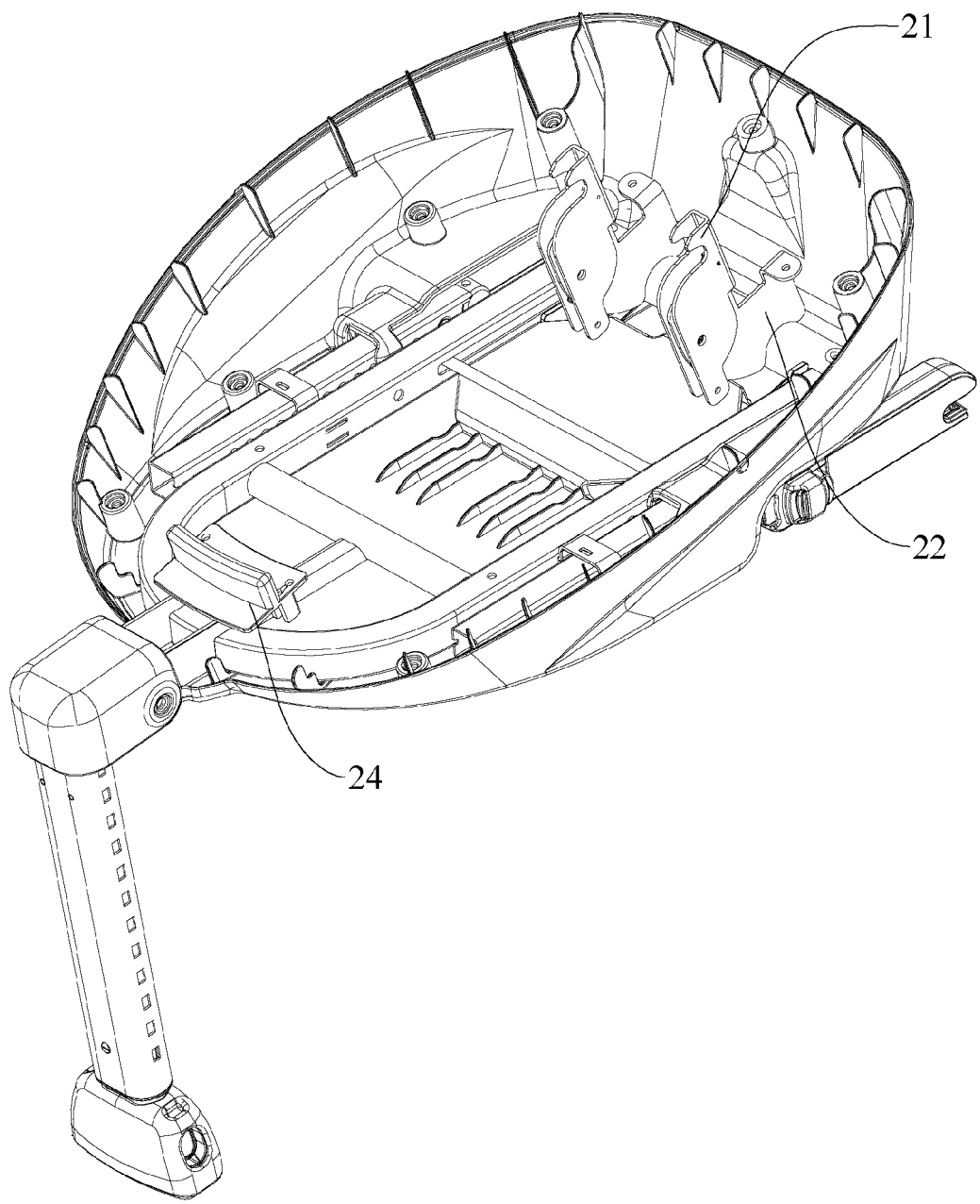
FIG. 5 is a schematic view of an internal structure of the base removing an outer shell in FIG. 4.

Referring to FIGS. 4 and 5, in some embodiments, the locking member 21 is rotatably disposed on the base 20, and the locking member 21 and the positioning member 11 are locked or unlocked by the rotation of the locking member 21. A fixing member 22 is disposed on the base 20, and the locking member 21 is fixed on the fixing member 22 by an axle pin, so that the locking member 21 can be rotatably disposed on the fixing member 22 around the rotating portion 212. The locking or unlocking of the locking member 21 and the positioning member 11 can be realized by the rotation of the locking member 21, and the structure is simple and the operation is convenient.

Figure 7:
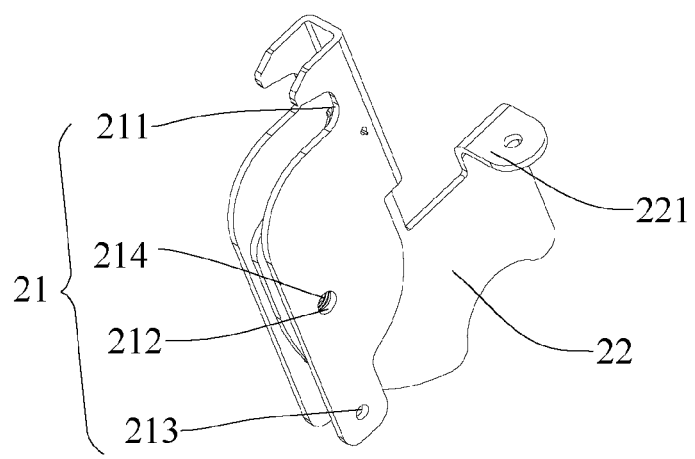
FIG. 7 is a schematic structural view of the locking member in FIG. 6.
Figure 8:
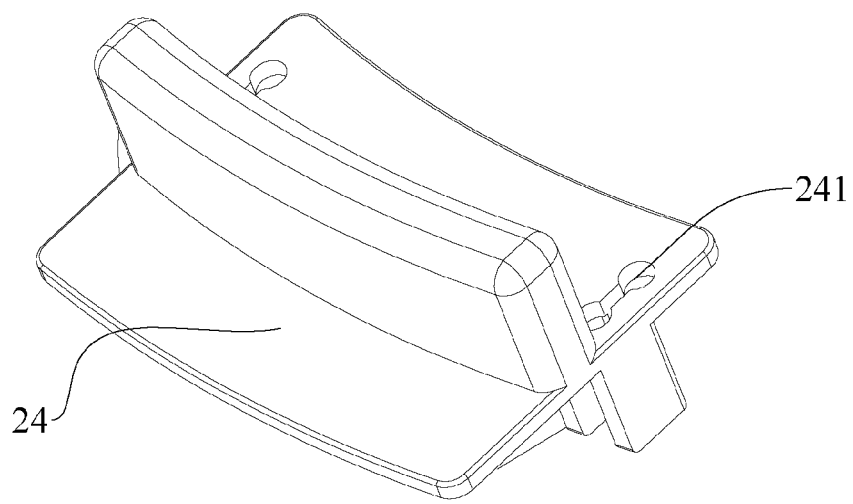
FIG. 8 is a schematic structural view of the operating member in FIG. 6.
Figure 9:
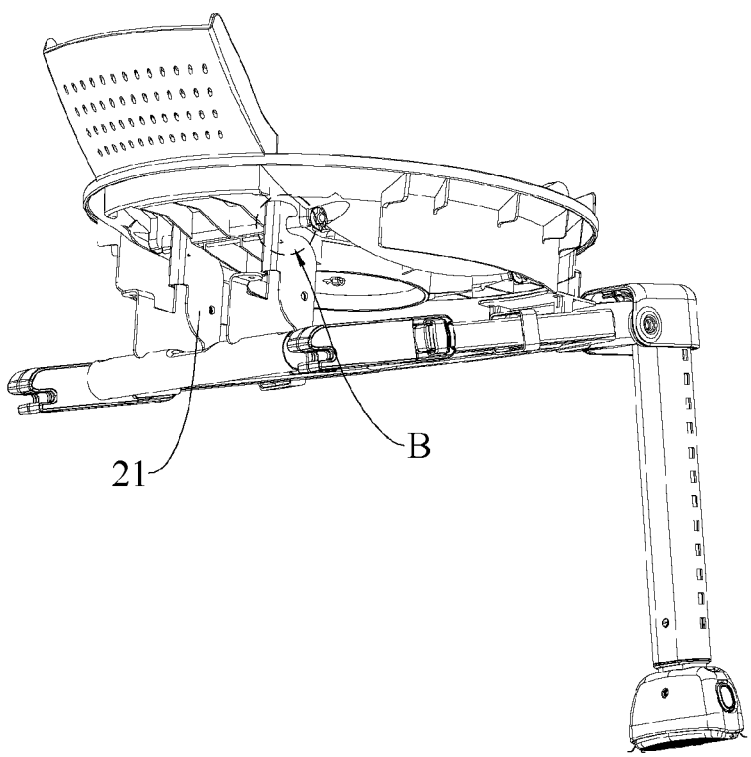
FIG. 9 is a state view of the child carrier of the present disclosure when the locking member and the positioning member are locked.
Figure 10:
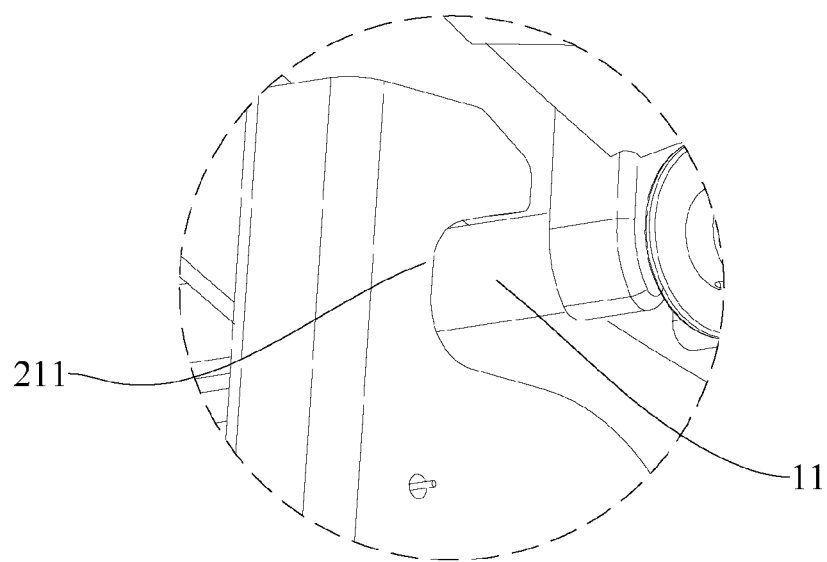
FIG. 10 is an enlarged view of B in FIG. 9.
Figure 11:
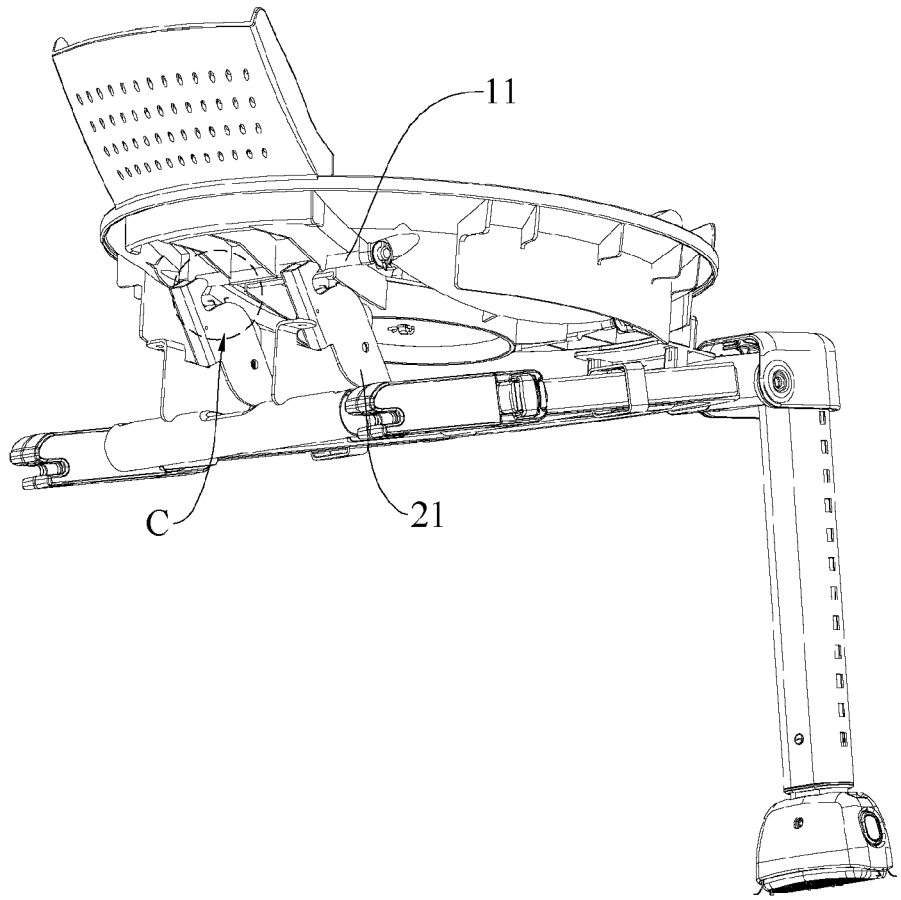
FIG. 11 is a state view of the child carrier of the present disclosure when the locking member and the positioning member are unlocked.
Figure 12:
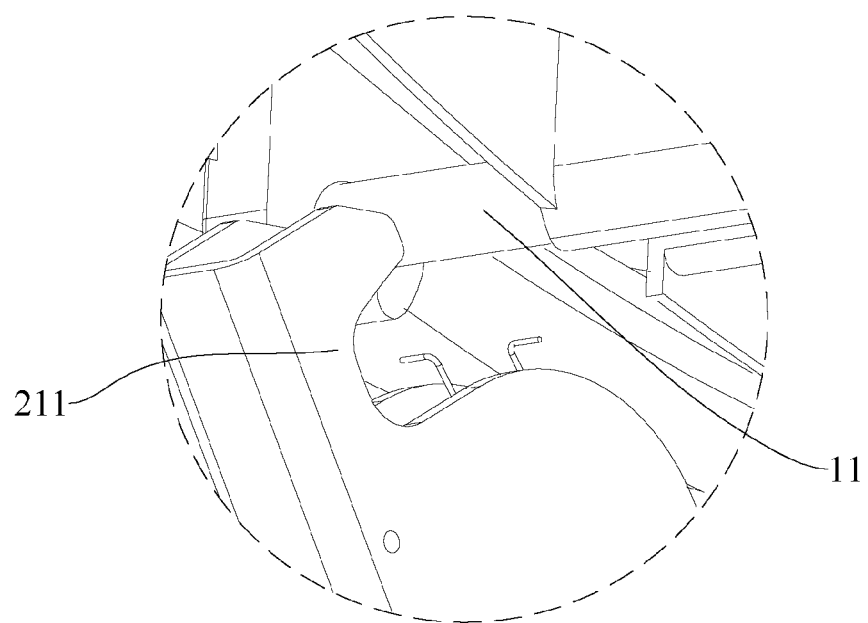
FIG. 12 is an enlarged view of C in FIG. 11.

Specifically, referring to FIG. 7, the fixing member 22 has a limiting portion 221 for limiting a rotation stroke of the locking member 21 thereon, and the limiting portion 221 protrudes out of the fixing member 22. The rotation stroke of the locking member 21 is limited by one limiting portion 221 to ensure that the locking member 21 can rotate within a certain range, instead of affecting a locking action of the locking member 21 because that the rotation of the locking member 21 exceeds the stroke range.

Referring to FIG. 7, in some embodiments, the locking member 21 has a hook portion 211 protruding from the base 20, the locking member 21 and the fixing member 22 are located within the base 20, and an upper shell of the base 20 is provided with a through slot from which the hook portion 211 protrudes, and the locking member 21 may rotate to protrude from the through slot to lock the positioning member 11; or the locking member 21 rotates into the through slot to contact with the limiting portion 221 so as to unlock the positioning member 11. The rotation of the locking member 21 rotates the hook portion 211 to engage the positioning portion 112 for locking or disengages the hook portion 211 from the positioning portion 112 for unlocking. The protruding hook portion 211 engages the protruding positioning portion 112 for locking, and the protruding hook portion 211 disengages from the protruding positioning portion 112 for unlocking; the hook portion 211 protrudes from the base 20, and the positioning portion 112 protrudes from the body 10, in this way, a better cooperation therebetween can achieve locking or unlocking.

Figure 13:
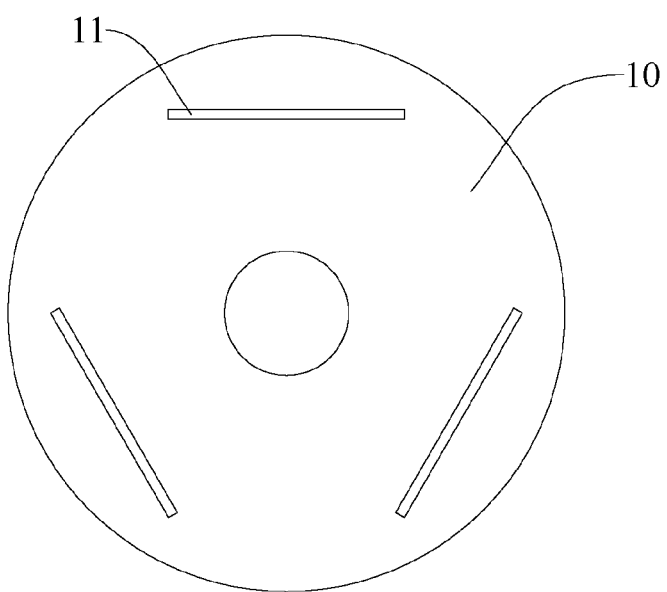
FIG. 13 is a schematic structural view showing that the positioning member is located on the same circle with a rotation center as a circle center and included angles between every two positioning members to the rotation center are the same in an embodiment of the present disclosure.
Figure 14:
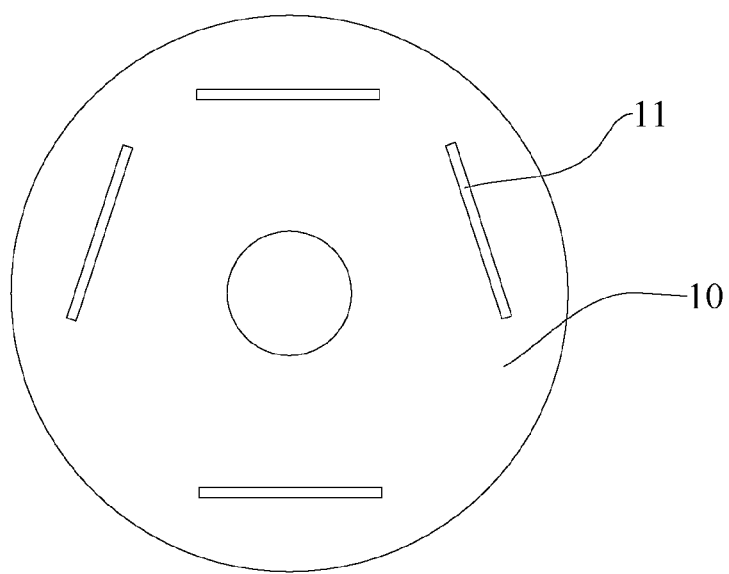
FIG. 14 is a schematic structural view showing that the positioning member is located on the same circle with a rotation center as a circle center and included angles between every two positioning members to the rotation center are different in an embodiment of the present disclosure.

Referring to FIGS. 13 and 14, in some embodiments, the positioning members 11 are located on the same circle with a rotation center as a circle center. Specifically, the positioning members 11 are located on a circle with the rotation center as the circle center, and the included angles between two adjacent ones of the positioning members 11 with the rotation center as the common end point are the same, that is, the body 10 after rotating relative to the base 20 can be fixed at a certain angle. A plurality of positioning members 11 is located on the same circle with the rotation center as the center. After the body 10 rotates at the same certain angle relative to the base 20 each time, the locking member 21 can cooperate with the corresponding positioning member 11 to achieve locking. Of course, the positioning member 11 is located on the circle with the rotation center as the circle center, and the included angles between two adjacent ones of the positioning members 11 with the rotation center as the common end point may also be different, that is, the fixed position where the body 10 rotates relative to base 20 every time may not be necessarily the same.

Figure 15:
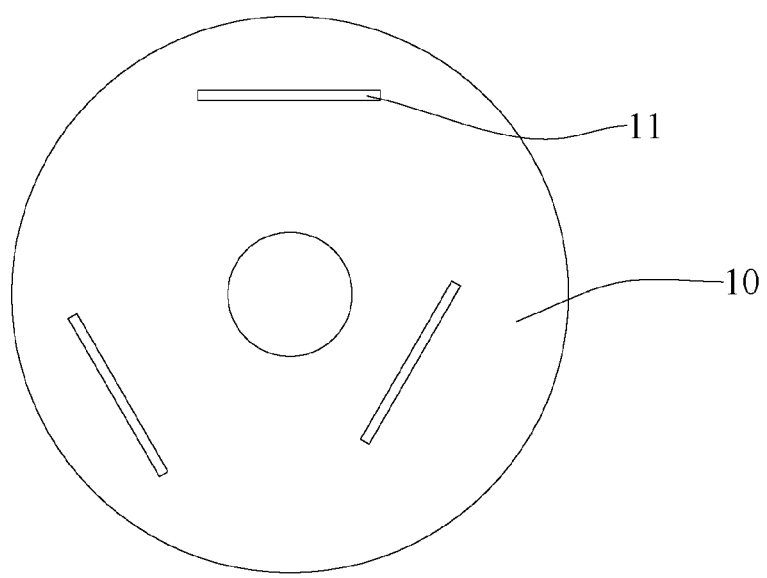
FIG. 15 is a schematic structural view showing that the positioning member is located on different circle with a rotation center as a circle center and included angles between every two positioning members to the rotation center are the same in an embodiment of the present disclosure.
Figure 16:
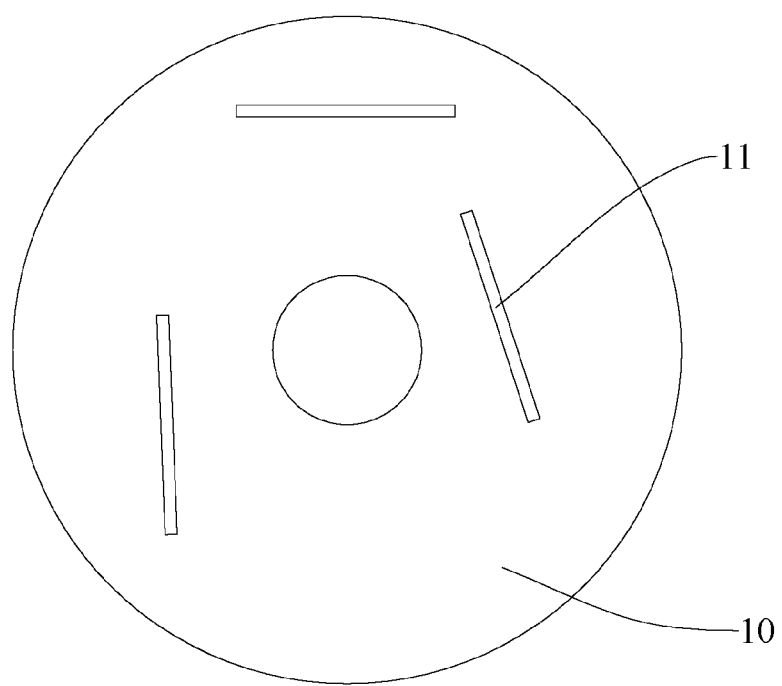
FIG. 16 is a schematic structural view showing that the positioning member is located on different circle with a rotation center as a circle center and included angles between every two positioning members to the rotation center are different in an embodiment of the present disclosure.

Referring to FIGS. 15 and 16, in some embodiments, the positioning members 11 are distributed on different circles with a rotation center as a circle center, that is, the positioning members 11 take the rotation center as the circle center and are concentrically located on different circles, as long as the two positioning members 11 take the circle center as the common end point and there is a certain angle between the two positioning members 11. It should be understood that the positioning member 11 may be located at any position within the circle that takes the rotation center as the circle center and has the largest area on the body 10, but two of the positioning members 11 may not be located on the same radius of the circle.

Specifically, the positioning member 11 is located on different circles with the rotation center as the circle center, and the included angles between the two adjacent ones of the positioning members 11 with the rotation center as the common end point are the same, that is, the body 10 after rotating relative to the base 20 can be fixed at a certain angle. A plurality of positioning members 11 is located on different circles with the rotation center as the circle center, after the body 10 rotates by the same certain angle relative to the base 20 every time, the locking members 21 can cooperate with the corresponding positioning members 11 to achieve locking. Of course, the positioning member 11 is located on different circle with the rotation center as the circle center, and the included angle between the two adjacent ones of the positioning members 11 with the rotation center as the common end point can also be different, that is, the fixed position where the body 10 rotates relative to the base 20 every time may not be necessarily the same.

Referring to FIGS. 9 to 12, in some embodiments, the locking member 21 can be engaged with the positioning member 11 at one position, and the locking member 21 can also be engaged with the positioning member 11 at multi positions. The number of the locking members 21 can be set according to the specific structure and actual needs. In addition, the locking member 21 may include one or more hook portions 211 protruding from the base 20, and may be engaged at one position or at multi positions. In this embodiment, the number of locking members 21 is two, and the number of hook portions 211 on each locking member 21 is one, but the number is not limited thereto. The two locking members 21 are engaged with and locked on the positioning portions 112 of the positioning members 11, which has a firm, stable and simple structure.

Referring to FIGS. 9 to 12, the positioning member 11 is fixed on the body 10 and between the positioning member 11 and the body 10 is disposed an engaging gap 113 which locking member 21 is able to engage. The engaging gap 113 is disposed so that the locking member 21 can be protruded into and engaged with the positioning member 11. The structure is simple and the design is reasonable.

Figure 2:
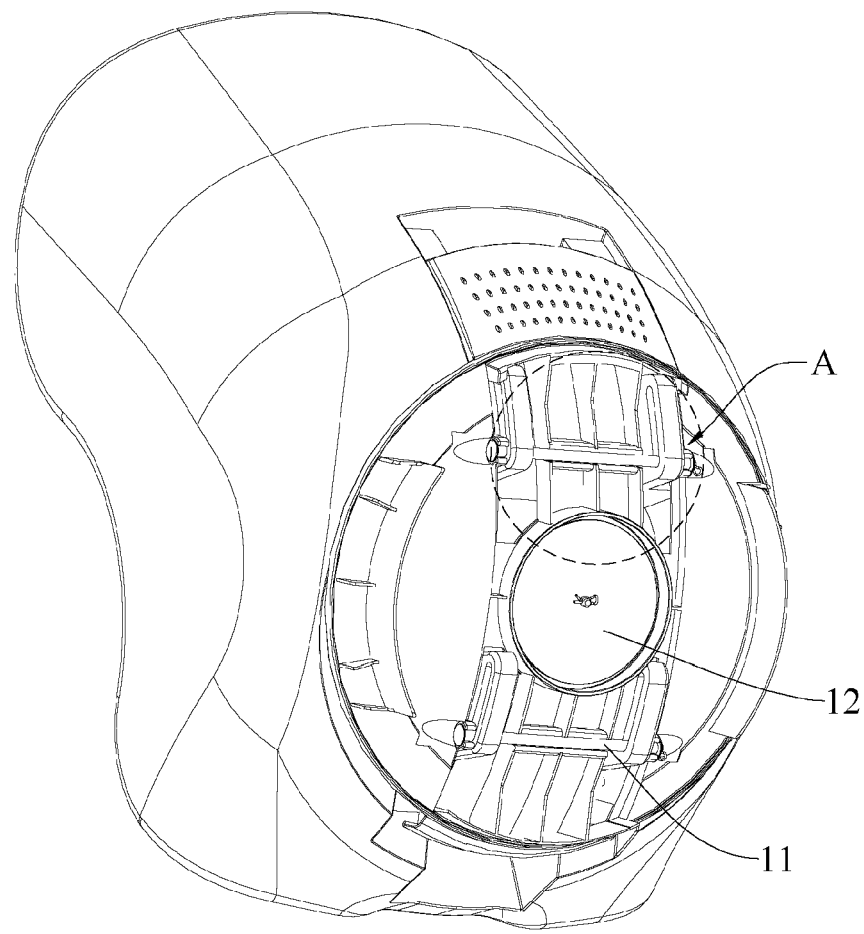
FIG. 2 is a schematic structural view of a body in FIG. 1.
Figure 3:
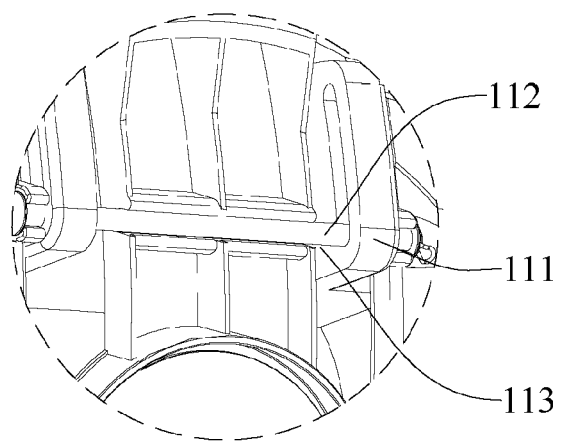
FIG. 3 is an enlarged view of A in FIG. 2.

Referring to FIGS. 2 and 3, in some embodiments, the positioning member 11 has a positioning portion 112, to which the locking member 21 locks, exposed outside the body 10. The positioning member 11 has a rod-shaped structure, and two end portions of the positioning member 11 pass through the body 10 and are fixed to the body 10 through a fixing portion 111. The positioning portion 112 is exposed outside the body 10, and it should be understood that the portion to which the locking member 21 locks is the positioning portion 112.

Figure 6:
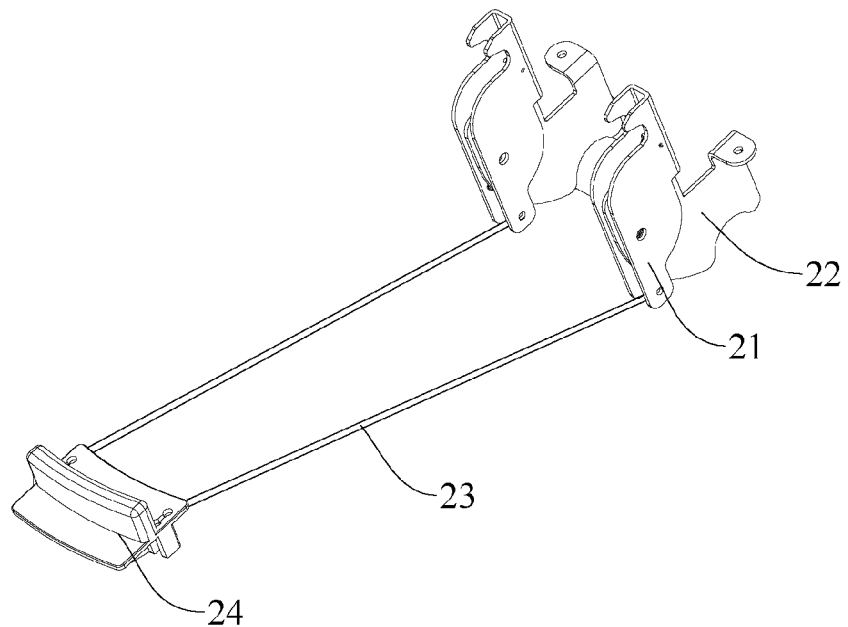
FIG. 6 is a schematic structural view of a locking member, a driving member and an operating member in FIG. 5.

Referring to FIGS. 6 to 7, specifically, the locking member 21 constantly has a tendency of locking the positioning member 11. The locking member 21 constantly has a tendency of resetting, so that when the body 10 stops rotating relative to the base 20, the locking member 21 constantly has the tendency of locking the positioning member 11 by the locking member 21 itself or the operating member 24. As long as the locking member 21 has a tendency of locking the positioning member 11, the body 10 can be locked in a proper position after rotating by a certain angle relative to the base 20, so that the body 10 is fixed on the base 20 in position as required.

Referring to FIGS. 6 to 7, the locking member 21 is connected with a driving member 23, the driving member 23 drives the locking member 21 to rotate for locking or unlocking the locking member 21 and the positioning member 11, and an end of the driving member 23 is fixed on the connecting portion 213 of the locking member 21. The locking member 21 is connected with the driving member 23 through the connecting portion 213, the driving member 23 exerts a rotating force on the locking member 21, and the driving member 23 drives the locking or unlocking of the locking member 21. For example, the driving member 23 has a steel wire structure, the steel wire can be deformed and has a stable and reliable structure, and occupies less space and is easy to be realized. When the driving member 23 is a steel wire, the locking member 21 is provided with a resilient member 214 that permits the locking member 21 to constantly lock the positioning member 11. At the end of the rotation of body 10 relative to base 20, the resilient member 214 of the locking member 21 itself can reset the locking member 21, and the locking member 21 constantly has a tendency of locking the positioning member 11, which has a simple structure and a reasonable design. The resilient member 214 has a spring structure. The spring structure has a certain telescopic function of resetting the locking member 21, and the structure is simple.

On the other aspect, referring to FIG. 6, the driving member 23 may also have a block structure. The driving member 23 plays a role of connecting the locking member 21 and the operating member 24, as long as the driving member 23 can drive the rotation of the locking member 21, and the present disclosure does not limit thereto. The driving member 23 with the block structure may directly act on the locking member 21 to directly drive the locking or unlocking of the locking member 21. When the unlocking is required, the operating member 24 acts, and the driving member 23 with the block structure directly pulls the locking member 21, and the locking member 21 unlocks the positioning member 11, so that the body 10 can rotate at a certain angle relative to the base 20 to a position as desired. When locking is required, the locking member 21 itself does not need the resilient member 214 due to the block structure of the driving member 23, and the operating member 24 resets to enable the driving member 23 to act on the locking member 21, and the locking member 21 resets and locks the positioning member 11 at the corresponding position to achieve locking. The structure is simple and the design is reasonable.

Referring to FIGS. 5 to 8, in some embodiments, an operating member 24 is connected to an end of the driving member 23 away from the locking member 21, and the operating member 24 is disposed on the base 20 or the body 10; the driving member 23 is driven to drive the locking member 21 by means of the movement of the operating member 24, to lock or unlock the locking member 21 and the positioning member 11. The operating member 24 may be disposed on the body 10 or base 20 to remotely control the locking or unlocking of the locking member 21. The structure is simple, the design is reasonable, and the operation is convenient. In this embodiment, the operating member 24 is disposed on the base 20, and is stretched back and forth or is stretched up and down, so that the operating member 24 drives the driving member 23 to be movable, so that the locking member 21 locks or unlocks the positioning member 11.

Referring to FIGS. 1 to 4 again, the base 20 is provided with an accommodating cavity 25 in which the body 10 rotates, and the body 10 can be rotatably disposed in the accommodating cavity 25. The body 10 is disposed within the accommodating cavity 25 of the base 20 and rotates within the accommodating cavity 25. Specifically, a concave portion 12 is disposed on the body 10, and a convex portion 26 in match with the concave portion 12 is disposed in the accommodating cavity 25. The convex portion 26 is disposed in the accommodating cavity 25, and the concave portion 12 is disposed on the body 10, so that the body 10 rotates along the convex portion 26 in the accommodating cavity 25, which has more compact fit, is safer and more reliable, and has a reasonable design.

The child carrier 100 of the present disclosure has an angle adjustment structure, and the angle adjustment structure is additionally provided with a positioning member 11 and a locking member 21 between the body 10 and the base 20, wherein the locking member 21 is movably disposed on the base 20, and at least two positioning members 11 are disposed on the body 10. When the body 10 and base 20 need the angle adjustment, the operating member 24 acts to drive the driving member 23 to rotate the locking member 21, so that the locking member 21 unlocks the positioning member 11, and furthermore the body 10 can rotate relative to the base 20, and thus the body 10 can adjust the angle relative to the base 20. After the body 10 rotates by a certain angle relative to the base 20, the operating member 24 acts on the driving member 23 to rotate the locking member 21 to lock the positioning member 11, or the locking member 21 locks the positioning member 11 under the action of the resilient member 214 thereof, such that the body 10 is fixed on the base 20, thus completing the angle adjustment of the body 10 rotating relative to the base 20. The body 10 can be rotated at different angles relative to the base 20. This can bring a variety of different visual experiences for the child sitting on the body 10, and also at the same time help the caregiver for taking care of the child. The caregiver can rotate the body 10 to a suitable position to facilitate for taking care of the child. Thus, the child carrier 100 of the present disclosure has strong practicability and is suitable for widespread use.

The above-disclosed are merely preferred examples of the present disclosure, and cannot be used to limit the scope of the present disclosure. Therefore, equivalent changes made based on the claims of the present disclosure all fall within the scope embraced by the present disclosure.

In an embodiment, the locking member is rotatably disposed on the base, and the locking member and the positioning member are locked or unlocked by means of rotation of the locking member. Locking or unlocking of the locking member and the positioning member can be realized by the rotation of the locking member, and the structure is simple and the operation is convenient.

In an embodiment, the locking member has a hook portion protruding from the base, the positioning member has a positioning portion protruding from the body, and the locking member is rotated such that the hook portion is rotated to engage the positioning portion for locking or to disengage the hook portion from the positioning portion for unlocking. The protruding hook portion engages the protruding positioning portion for locking, and the protruding hook portion is disengaged from the protruding positioning portion for unlocking; the hook portion protrudes out of the base, and the positioning part protrudes out of the body, so that a better coordination can be made to achieve locking or unlocking.

In an embodiment, the positioning member is located on the same circle with a rotation center as a circle center, that is, a plurality of positioning portions are located on the same circle with a rotation center as a circle center. After the body rotates by a certain angle relative to the base, the locking portion can cooperate with the corresponding positioning portion to achieve locking.

In an embodiment, the positioning member is distributed on different circle with a rotation center as a circle center, as long as the two positioning members take the circle center as a common endpoint and there is a certain angle between the two positioning members.

In an embodiment, the locking member is engaged with the positioning member at one position, or the locking member is engaged with the positioning member at multi positions. The locking member can include one or more hook portions protruding out of the base and engaged at one position or at multi positions, which has a simple structure and is easy to be realized.

In an embodiment, the positioning member is secured to the body, and between the positioning member and the body is disposed an engaging gap which locking member is able to engage. By setting the engaging gap, the locking member protrudes into and engages with the positioning member. The structure is simple and the design is reasonable.

In an embodiment, the positioning member has a positioning portion to which the locking member locks. The positioning member is partially penetrated and fixed on the body, and the portion locked by the locking member is the positioning portion.

In an embodiment, the locking member constantly has a tendency of locking the positioning member. The locking member constantly has a tendency of resetting, when the body stops rotating relative to the base, the locking member can constantly have a tendency of locking the positioning member through the locking member itself or through the operating member.

In an embodiment, a fixing member is disposed on the base, and the locking member is rotatably disposed on the fixing member. The structure is simple and the design is reasonable.

In an embodiment, the fixing member protrudes a limiting portion for limiting a rotation stroke of the locking member. Since the rotation stroke of the locking member is limited by a limiting portion, it can be ensured that the locking action of the locking member cannot be affected due to its rotation exceeding the stroke range.

In an embodiment, the locking member is connected with a driving member, and the driving member drives the locking member to rotate for locking or unlocking the locking member and the positioning member. The driving member exerts a rotating force on the locking member, to drive the locking member to lock or unlock.

In an embodiment, the driving member has a steel wire structure. The steel wire structure is simple, easy to realize and has a good effect.

In an embodiment, the locking member is provided with a resilient member constantly driving the locking member to lock the positioning member. When the driving member is a steel wire, the rotation of the body relative to the base is completed, and the resilient member of the locking member itself can drive the locking member to reset and constantly has a tendency of locking the positioning member, the structure is simple, and the design is reasonable.

In an embodiment, the resilient member has a spring structure. The spring structure has a certain telescopic function, and thus can drive the locking member to reset, and the structure is simple.

In an embodiment, the driving member has a block structure. The driving member plays the role of connecting the locking member and the operating member, as long as the driving member can drive the rotation of the locking member. The block structure of the driving member may also directly act on the locking member, under the action of the operating member, the block structure of the driving member directly acts on the locking member, and the locking member itself does not need to be provided with a resilient member. The structure is simple and the design is reasonable.

In an embodiment, an operating member is connected to an end of the driving member away from the locking member, and the operating member is disposed on the base or the body; the driving member is driven by movement of the operating member to drive the locking member, so that the locking member locks or unlocks the positioning member. The operating member may be disposed on the body or the base to remotely control the locking or unlocking of the locking member. The structure is simple, the design is reasonable, and the operation is convenient.

The present disclosure provides a child carrier, which includes a body for carrying a child and a base rotatably connected with the body, and also includes an angle adjustment structure.

In an embodiment, the base is provided with an accommodating cavity in which the body rotates, and the body is rotatably disposed in the accommodating cavity. The body is safer and more reliable to rotate in a certain containing space, and can not deviate the rotation track, and the design is reasonable.

In an embodiment, a concave portion is disposed on the body, and a convex portion in cooperation with the concave portion is disposed within the accommodating cavity. The convex portion is disposed in the accommodating cavity, and the concave portion is disposed on the body, so as to have more compact fit and reasonable design.

According to the angle adjustment structure provided by the present disclosure, a positioning member and a locking member are disposed between the body and the base. When the locking member unlocks the positioning member, the body may be rotatable relative to the base. After the body rotates by a certain angle relative to the base, the positioning member is locked by the locking member, so that the body is secured to the base, so as to complete the rotation angle adjustment of the body relative to the base. The present disclosure has a simple structure that the body can be rotated at different angles relative to the base when the locking member unlocks the positioning member. This can bring a variety of different visual experiences for the child, and also at the same time help the caregiver for taking care of the child. The caregiver can rotate the body to a suitable position to facilitate for taking care of the child. Thus, the angle adjustment structure has strong practicability and is suitable for widespread use.

What is claimed is:

1. An angle adjustment structure for adjusting an angle of a body relative to a base, the angle adjustment structure comprising:
    at least two positioning members and a locking member for locking with one of the positioning members at a time,
    wherein the body is rotatably connected to the base, such that the body rotates about an axis of a circular shaped accommodating cavity within the base, and the body is provided with the at least two positioning members,
    wherein the locking member is movably disposed on the base, and the locking member and one of the positioning members are locked or unlocked by movement of the locking member, and
    wherein the body is prevented from rotating around the axis by locking the locking member with one of the positioning members,
    wherein the locking member is rotatably disposed on the base, and the locking member and one of the positioning members are locked or unlocked by rotation of the locking member.

2. The angle adjustment structure according to claim 1, wherein the locking member has a hook portion protruding from the base, each of the positioning members have a positioning portion protruding from the body, and the locking member is rotated such that the hook portion is rotated to engage the positioning portion for locking or to disengage the hook portion from the positioning portion for unlocking.

3. The angle adjustment structure according to claim 1, wherein each of the positioning members are located a same radial distance from a rotation center of a concave portion of the body.

4. The angle adjustment structure according to claim 1, wherein the locking member is configured to engage with the positioning members at multiple circumferential positions about the body.

5. The angle adjustment structure according to claim 1, wherein each of the positioning members are secured to the body, and an engaging gap which locking member is able to engage is disposed between each of the positioning members and the body.

6. The angle adjustment structure according to claim 1, wherein each of the positioning members have a positioning portion to which the locking member locks.

7. The angle adjustment structure according to claim 1, wherein the locking member constantly has a tendency of locking one of the positioning members.

8. The angle adjustment structure according to claim 1, wherein the locking member is connected with a driving member, and the driving member drives the locking member to rotate for locking or unlocking the locking member and the positioning member.

9. The angle adjustment structure according to claim 8, wherein the driving member has a steel wire structure.

10. The angle adjustment structure according to claim 9, wherein the locking member is disposed with a resilient member, the resilient member constantly drives the locking member to lock one of the positioning members.

11. The angle adjustment structure according to claim 10, wherein the resilient member has a spring structure.

12. The angle adjustment structure according to claim 8, wherein the driving member has a block structure.

13. The angle adjustment structure according to claim 8, wherein an operating member is connected to an end of the driving member away from the locking member, and the operating member is disposed on the base or the body; the driving member is driven by movement of the operating member to drive the locking member, so that the locking member locks or unlocks the positioning members.

14. A child carrier, comprising a body for carrying a child and a base rotatably connected with the body, wherein the child carrier further comprises the angle adjustment structure according to claim 1.

15. The child carrier according to claim 14, wherein the body is rotatably disposed within the circular shaped accommodating cavity.

16. The child carrier according to claim 15, wherein a concave portion is disposed on the body, and a convex portion in cooperation with the concave portion is disposed within the accommodating cavity.

17. An angle adjustment structure for adjusting an angle of a body relative to a base, the angle adjustment structure comprising:
    at least two positioning members and a locking member for locking with one of the positioning members at a time,
    wherein the body is rotatably connected to the base, such that the body rotates about an axis of a circular shaped accommodating cavity within the base, and the body is provided with the at least two positioning members,
    wherein the locking member is movably disposed on the base, and the locking member and one of the positioning members are locked or unlocked by movement of the locking member, and
    wherein the body is prevented from rotating around the axis by locking the locking member with one of the positioning members,
    wherein at least some of the positioning members are located at different radial distances from a rotation center of a concave portion of the body.

18. An angle adjustment structure for adjusting an angle of a body relative to a base, the angle adjustment structure comprising:
    at least two positioning members and a locking member for locking with one of the positioning members at a time,
    wherein the body is rotatably connected to the base, such that the body rotates about an axis of a circular shaped accommodating cavity within the base, and the body is provided with the at least two positioning members, wherein the locking member is movably disposed on the base, and the locking member and one of the positioning members are locked or unlocked by movement of the locking member, and wherein the body is prevented from rotating around the axis by locking the locking member with one of the positioning members, wherein a fixing member is disposed on the base, and the locking member is rotatably disposed on the fixing member.

19. The angle adjustment structure according to claim 18, wherein the fixing member protrudes a limiting portion for limiting a rotation stroke of the locking member.

\* \* \* \* \*